United States Patent [19]
Wilson

[11] Patent Number: 5,146,183
[45] Date of Patent: Sep. 8, 1992

[54] PHASE LOCK LOOP FOR SECTOR SERVO SYSTEM

[75] Inventor: Rosser S. Wilson, Menlo Park, Calif.

[73] Assignee: Maxtor Corporation, San Jose, Calif.

[21] Appl. No.: 767,073

[22] Filed: Sep. 27, 1991

[51] Int. Cl.$^5$ .................. G11B 5/596; G11B 21/10; H03L 7/08

[52] U.S. Cl. .................. 331/1 A; 331/14; 331/25; 331/27; 360/77.05; 360/77.06; 360/77.08

[58] Field of Search .............. 331/1 A, 14, 18, 25, 331/27; 360/75, 77.05, 77.08, 77.06, 77.07; 375/120

[56] References Cited

U.S. PATENT DOCUMENTS

| | | | |
|---|---|---|---|
| 4,297,734 | 10/1981 | Laishley et al. | 360/78.06 |
| 4,901,035 | 2/1990 | Cleveland | 331/14 |
| 5,089,757 | 2/1992 | Wilson | 360/77.02 |

*Primary Examiner*—Siegfried H. Grimm

*Attorney, Agent, or Firm*—Hecker & Harriman

[57] ABSTRACT

A phase lock loop for a sector servo system. A servo phase lock loop oscillator provides the control timing function of the servo. Initially, the PLO is locked in frequency to a frequency reference obtained from a counter/timer in a digital signal processor (DSP) used to control the servo system. Subsequent to acquisition of the nominal operation frequency, the PLO is caused to lock in turn to gap and frame character markers derived from the digital information encoded into the servo burst. Transition between PLO reference sources is commanded by the microprogram running in the DSP, based upon microprogram assessment of servo PLO status. The PLO outputs timing control tags to the servo control logic and PES demodulator, a reference clock to the file read/write channel, and interrupt pulses to the DSP to synchronize DSP operation with the servo hardware, and initiate periodic DSP computation of the control algorithm.

18 Claims, 7 Drawing Sheets

PHASE LOCK LOOP FOR SECTOR SERVO SYSTEM

BACKGROUND OF THE INVENTION

1. FIELD OF THE INVENTION

This invention relates to the field of sector servo systems for use in a magnetic disk drive, and in particular, to a phase lock loop for providing timing signals within the servo system.

2. BACKGROUND ART

In a typical rotating medium based storage system, data is stored on magnetic disk in a series of concentric "tracks." These tracks are accessed by a read/write head that detects variations in the magnetic orientation of the disk surface.

The read/write head moves back and forth radially on the disk under control of a head-positioning servo mechanism so that it can be selectively positioned over a selected one of the tracks. Once in position over a track, the servo mechanism causes the head to trace a path which follows the center line of the selected track. This maximizes head-to-track registration, and permits accurate recording and reproduction of data on the track.

In order to effectively operate the head positioning servo mechanism, it is necessary that the position of the head with respect to the tracks be known. In addition to knowing which track a head is over, it is necessary to know where on that particular tracks the head is positioned.

In the prior art, position information is provided through the use of special servo patterns that are reproduced by the recording heads in the drive. A servo pattern is a permanent pattern prerecorded on the storage disk at the time of assembly of the completed disk drive. The servo pattern is detected by the head, and after appropriate signal processing, yields track position information. One prior art method of providing servo position information is known as a "sector" servo method.

In the "sector" servo method, bursts of servo information are disposed on a disk surface in between data areas. Each servo burst contains track position information, track radial address fields and index information. In sector servo, space-division multiplexing of data and servo information minimizes track misregistration effects, since both data and servo information are reproduced from the same surface with a common head. Thus, sector servo schemes are preferred over dedicated servo schemes for disk drives with high track density. Of course, in a dedicated servo format, the dedicated servo surface could be recorded in a sectorized fashion.

Once a data track has been located, it is important that the read/write head be kept on the center line of that track for accurate reading and writing operations. This positioning of the read/write head on the center line of a track is known is "track following." Variations from the center line of the track being followed produce a position error signal (PES) which is used to generate a corrective input to the head positioning apparatus to move the head back to the center line position.

Servo position information on either side of the center line of a data track are read and detected by the magnetic heads. A PES supplying data on the deviation of the magnetic head from the track center is detected by determining the amplitude difference of the two servo position signals. If this difference is zero, it is assumed that the head is precisely over the track. A positive or negative PES indicates that the head is off center in one direction or the other, and suitable correction signals are generated.

Prior art in the field of PES demodulation in the dedicated servo environment has typically made use of phase lock loop techniques. However, phase lock loops do not enjoy widespread application in sector servo systems. The dispersion of customer data between servo samples complicates the acquisition of lock of the phase lock loop to servo information. Also, the comparatively low servo sample rate in sector servo systems aggravates the requirement that loop lock be maintained with a minimum phase fluctuation in the event of isolated, missing servo samples caused by flaws in the record medium. It is desirable to have a phase lock loop sector servo system that can function without these difficulties.

Prior art incorporating phase lock loops in sector servo is limited in scope U.S. Pat. No. 4,297,734 to Laishley, et al., cites application of a phase lock loop in a sector servo, but discloses no detail of its implementation. An article by Yamada et. al. entitled, "Sector Servo System for High Speed Seeking and High Track Density", in IEEE Tr. Mag. Vol. 24, No. 6, Nov. 1988, treats the design of a high performance sector servo, yet makes no mention of circuit techniques applicable to the generation of a position error signal.

One prior art method commonly used in commercially available sector servo disk files is to employ a counter which is periodically reset upon detection of a synchronization point, and advanced by fixed frequency source. This method has the disadvantage of sensitivity to variations in disk rotation rate. It can also be mistriggered by noise. Thus, it cannot deliver a true phase-coherent reference to the data write process.

SUMMARY OF THE INVENTION

The role of the phase lock loop oscillator (PLO) in a disk file servo system is to provide a timing reference coherent in phase and frequency with the disk rotation rate. This reference governs the sequencing of the position error signal (PES) demodulation process, and serves as a time base for data write operations. The present invention is designed for use in a sector servo scheme or in a dedicated servo scheme wherein the dedicated surface is recorded in a sectorized format.

The servo phase lock loop oscillator provides the control timing function of the servo. Initially, the PLO is locked in frequency to a frequency reference obtained from a counter/timer located in a servo digital signal processor (DSP). Subsequent to acquistion of the nominal operating frequency, the PLO is caused to lock in turn to gap and frame character markers derived from the digital information encoded in the servo burst. Transition between PLO reference sources in commanded by the microprogram running in the DSP. The microprogram assesses servo PLO status and alters PLO mode over control and status wires. The PLO outputs timing control tags to the servo control logic and PES demodulator, reference clock to the file read/write channel, and sector pulses to the DSP to synchronize DSP operation with the servo hardware and to initiate periodic DSP computation of the control algorithm.

The use of the DSP microcode to control the staged mode-switching of the PLO provides flexibility in loop capture characteristics without adding to the circuit complexity.

The invention also utilizes "anticipating" circuitry. Immunity to lost samples is conferred by an anticipating circuit which suppresses loop phase update in the absence of a servo reference signal. The PLO then provides an indication to the DSP of a detected lost sample to allow the DSP to detect loss of lock.

The invention also incorporates a windowing function. Noise rejection of the loop is enhanced by a windowing function which admits a loop phase correction operation to occur only if the incoming servo reference information occurs within a narrow time slot bracketing its expected time of arrival.

DETAILED DESCRIPTION OF THE PRESENT INVENTION

A phase lock loop timing means for synchronizing sector servo applications is described. In the following description, numerous specific details, such as servo format, word length, etc. are set forth in order to provide a more thorough description of this invention. It will be apparent, however, to one skilled in the art that the present invention may be practiced without these specific details. In other instances, well-known features have not been described so as not to obscure the present invention. It will also be apparent to one skilled in the art that the present invention could be practiced in a dedicated servo environment simply by recording the dedicated servo surface with a sectorized pattern.

The use of digital sector servo provides several advantages. For example, with digital sector servo, spindle tilt effects and thermal variations do not affect disk drive track misregistration performance since the data and servo information share a common head and surface. Another advantage is the applicability of digital sector servo to disk media fabricated of non-metallic materials such as glass, etc. Time multiplexed data/servo storage precludes cross talk into the servo channel from a writing data head because no write operation is permitted during reproduction of servo information. Sector servo can provide more efficient use of disk space, especially in disk drives having a small number of disks, since sector servo information occupies a fixed small fraction of each disk surface.

In the present invention, the versatility of the DSP is utilized by controlling the phase locking characteristics of the servo through the microcode of the DSP. This provides flexilbility without associated circuit complexity. It allows the servo synchronizing circuitry (PLO) to progress from initialization with an external frequency reference to ultimately phase-lock with the pre-recorded sector servo information.

In addition, circuitry within the PLO provides a windowing function that provides enhanced noise immunity to the PLO. An anticipating means is similarly produced which disallows phase update of the PLO in the event of a missing servo sample. This provides the PLO with greater phase stability than that found in prior art sector servo schemes.

Figure 1:
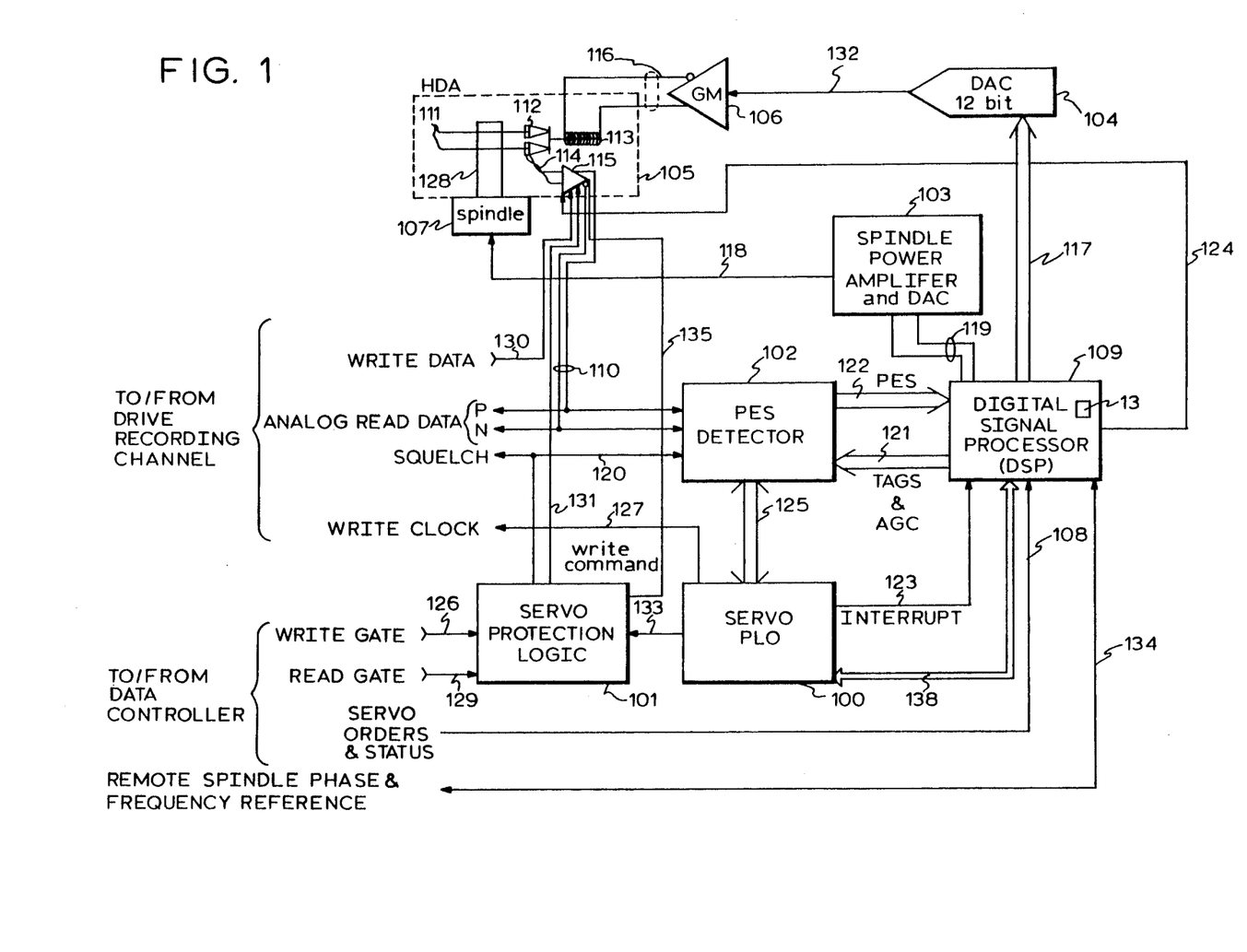
FIG. 1 is a block diagram of the environment in which the invention may be practiced.

A block diagram illustrating a digital sector servo system for use with the present invention is illustrated in FIG. 1. The head disk assembly (HDA) is generally illustrated by that area of FIG. 1 enclosed by dashed line 105. The head disk assembly includes one or more disks 111 mounted on a spindle shaft 128. The spindle shaft 128 is coupled to a spindle motor 107 for rotating the shaft and ultimately the disks 111. The spindle power amplifier 103 provides a drive signal 118 to the spindle motor 107.

The spindle power amplifier 103 converts analog spindle current commands to high power current flow in the spindle motor 107. These samples are conveyed by cable 119, which also delivers indications of the status of amplifier 103 to DSP 109. The amplifier 103 also provides commutation for the brushless DC spindle motor as is well known in the art.

The surfaces of each disk are accessed by read/write heads 112 which are mechanically coupled to voice coil actuator motor 113. The voice coil actuator motor 113 provides radial movement of the heads relative to the disk suface. This permits the heads to be moved from track to track on each disk. The heads detect space-division multiplexed servo and data information reproduced from the surface of the rotating disk and provide the combined servo and data signals on lines 114 to preamplifier 115. Arm-mounted preamplifier 115 possesses both write and read modes, and is positioned in proximity to recording heads 112. A head select signal 124 for selecting one of read/write heads 112 is provided to the HDA 105 from the digital signal processor (DSP) 109 upon command by the data controller. The data controller governs overall drive sequencing operations, and implements a specific device-level system interface.

A write command signal 131 from servo protection logic block 101 switches the heads from the read to write mode during write operations. During write operations, data to be recorded on the disk is presented on wire 130 by the data controller (not shown), and write gate line 126 is asserted. Differential analog read data 110 is delivered by preamplifier 115 and coupled to PES detector 102 and to the analog read path of the read channel (not shown) of the disk drive. A squelch signal 120 from the servo protection logic is also provided to the PSE detector 102 and to the read channel.

The PES detector 102 demodulates the differential analog read signals 110 to generate a digital position error signal (PES) 122 which is provided to the digital signal processor 109. The digital signal processor (DSP) 109 operates upon the PSE 122 to produce a control signal 117 that is provided to digital to analog coverter 104. The control signal 117 is in the form of a digital word, which in the preferred embodiment of this invention is a 12-bit word. The word-length in the DSP 109 is 16 bits in the preferred embodiment of the invention. However, any size word can be utilized without departing from the scope of the present invention.

The DSP 109 processes position error signal samples through compensation algorithms in microcode and provides a motor current control signal to the voice coil motor 113 (through DAC 104 and amplifier 106) to hold the heads 112 on track centerline position. Suitable compensation algorithms are described in, for example, the book by Franklin and Powell, "Digital Control of Dynamic System."

The DSP 109 also controls the repositioning of a head to a new track during a seek operation. Position error signal samples required in the control algorithms are received from the PES detector 102 on cable 122. The DSP also receives samples in digital form of VCM motor current (not shown) to account for VCM saturation during seek operations. Spindle speed and phase lock to remotely applied reference pulses applied to DSP 109 over line 134 is also accomplished using control algorithms in the DSP 109. Algorithms 13 operate within DSP 109 to control head-positioning and AGC functions. DSP 109 outputs control signals and a frequency reference signal (137) through bus 138 to PLO 100. The DSP then receives status signals from PLO 100 through bus 138. The control signals are produced according to the microcode within DSP 109. The digital signal processor can be the single-chip TMS320C14 or TMS320C25 devices manufactured by Texas Instruments, or any other suitable DSP.

DAC 104 converts the digital word into an analog signal 132 and delivers the signal to power amplifier 106, which converts the signal to a current drive signal in wires 116 to move actuator 113 and ultimately the heads 112 to maintain a centerline position on the desired track, or to access a new track. The digital signal processor 109 receives servo orders and status on cable 108 from the data controller. These orders include seek, head switch, rezero and spindle spin up/spin down commands. Status is presented on this same cable to indicate command completion and fault conditions. The DSP 109 provides control tags and automatic gain control (AGC) information over wires 121 to the PES detector 102.

The servo PLO 100 is the subject of the present invention, and is a phase-lock loop with a counter/divider in the feedback path. Decoded counter states control event sequencing in the servo sector interval. The servo PLO 100 receives digital information on a wire in bus 125 from PES detector 102. This information is in the form of pulses which coincide with the location of characters encoded in the servo burst. The servo PLO 100 locks in phase to these pulses, and thus to the servo information. Staging of PLO 100 phase-lock operations is controlled by the DSP using signals on bus 138.

Sequencing of PES detector 102 is controlled by servo PLO 100 by further signals on cable 125. Servo PLO 100 also generates a reference timing clock for data write operations. This clock is transmitted to the data controller over wire 127. Further, servo PLO solicits an interrupt of DSP 109 on wire 123 at each servo sector point. This controls the sample rate of the control algorithms encoded in the DSP microcode.

Servo PLO 100 determines sequencing in the servo protection logic block 101 by tags transmitted on bus 133. Under control of these signals, gating functions are provided in block 101 to prevent issuance of write commands on wire 131 during the time that servo information is being reproduced from the disk. Additional safety functions performed in servo protection logic block 101 are detection of fault conditions in the preamplifier by monitoring of the state of write unsafe line 135, and detection of conflicting write and read gate states on lines 126 and 129.

Servo protection logic (SPL) block 101, under control of servo PLO 100, produces a squelch signal on wire 120. The squelch signal facilitates rapid re-establishment, following a write or head switch operation, of equilibrium conditions in PES detector 102, and in the read channel of the disk drive.

Figure 2A:
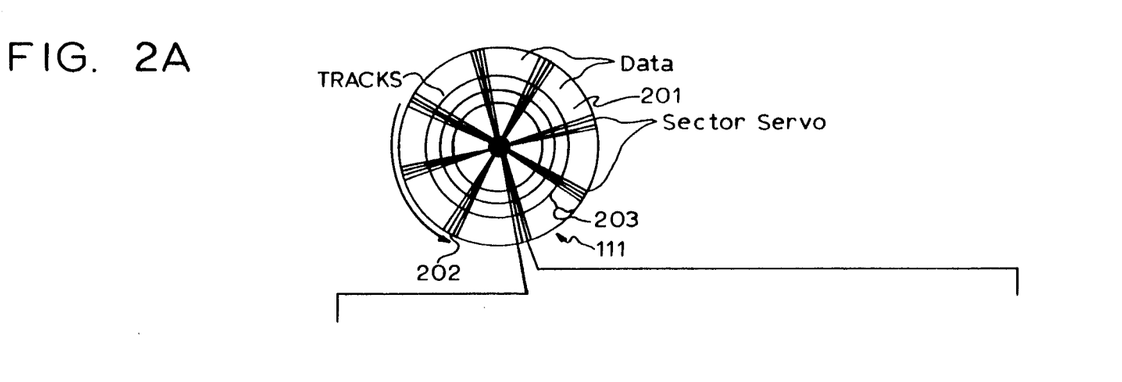
FIG. 2A illustrates a sector disk format.

FIG. 2A illustrates a typical sector servo burst format for use with the present invention. The disk 111 has a plurality of concentric tracks 203 formed on the surface of the disk. Each track is divided into servo areas 202 and data areas 201. Data is recorded in area 201. The sector servo information 202 forms substantially pie-shaped bursts on the surface of the disk radiating from the center of the disk. Servo bursts are written at equi-spaced circumferential intervals and in phase coherence with bursts on adjacent tracks.

Figure 2B:
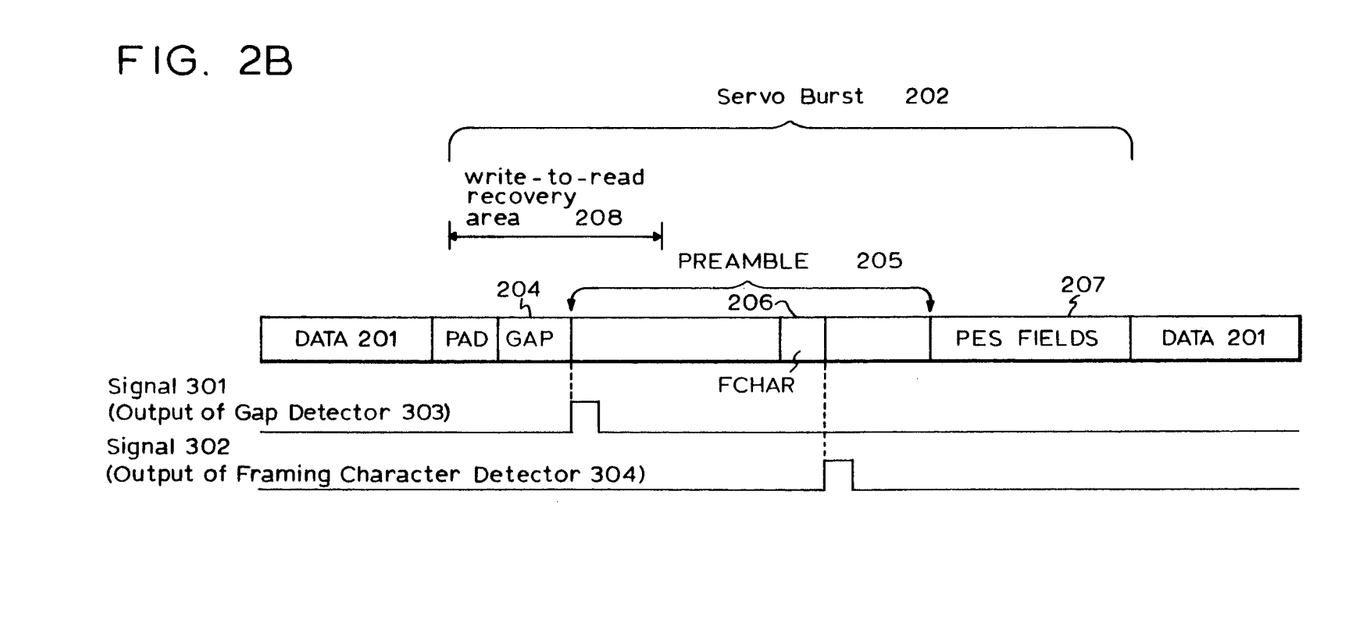
FIG. 2B illustrates the format of a sector servo burst.

An example of a servo burst 202 is illustrated in FIG. 2B. The servo burst 202 is bordered at the beginning and at the end by data fields 201. The servo burst 202 begins with a gap area 204 of no signal transitions. This void can be unambiguously detected in the presence of customer data 201 interspersed between the servo bursts 202. The gap 204 lies wholly within the Write-to-Read recovery area 208; its inclusion in the servo format causes no loss of recording space. Following the gap 204 is a preamble area 205, embedded in which is framing character (FCHAR) 206. Framing character 206 is preferably constructed with sufficient redundancy to permit detection in the presence of minor disk surface flaws, and provides the phase reference to PLO 100 once PLO 100 has been locked to the servo burst 202. The spacing between gap 204 and framing character 206 is accurately fixed. Disposed after preamble area 205 are the digital and analog position error signal (PES) fields 207. The PES fields 207 are immediately followed by the next data field 201. Analog PES information can be encoded in known fashion using synchronously-detectable differential burst or null techniques. Digital PES and framing character information can be encoded using sequences of coherent and anti-coherent transitions to code for binary "zero" and "one," respectively. Digital data thus encoded can be detected using a synchronous integrate-and-dump operation at the bit rate. Depicted also in FIG. 2B to illustrate their timing relative to the servo burst 202 are signal 301, generated by gap detector 303, and signal 302, generated by framing character detector 304 from FIG. 3.

Figure 5:
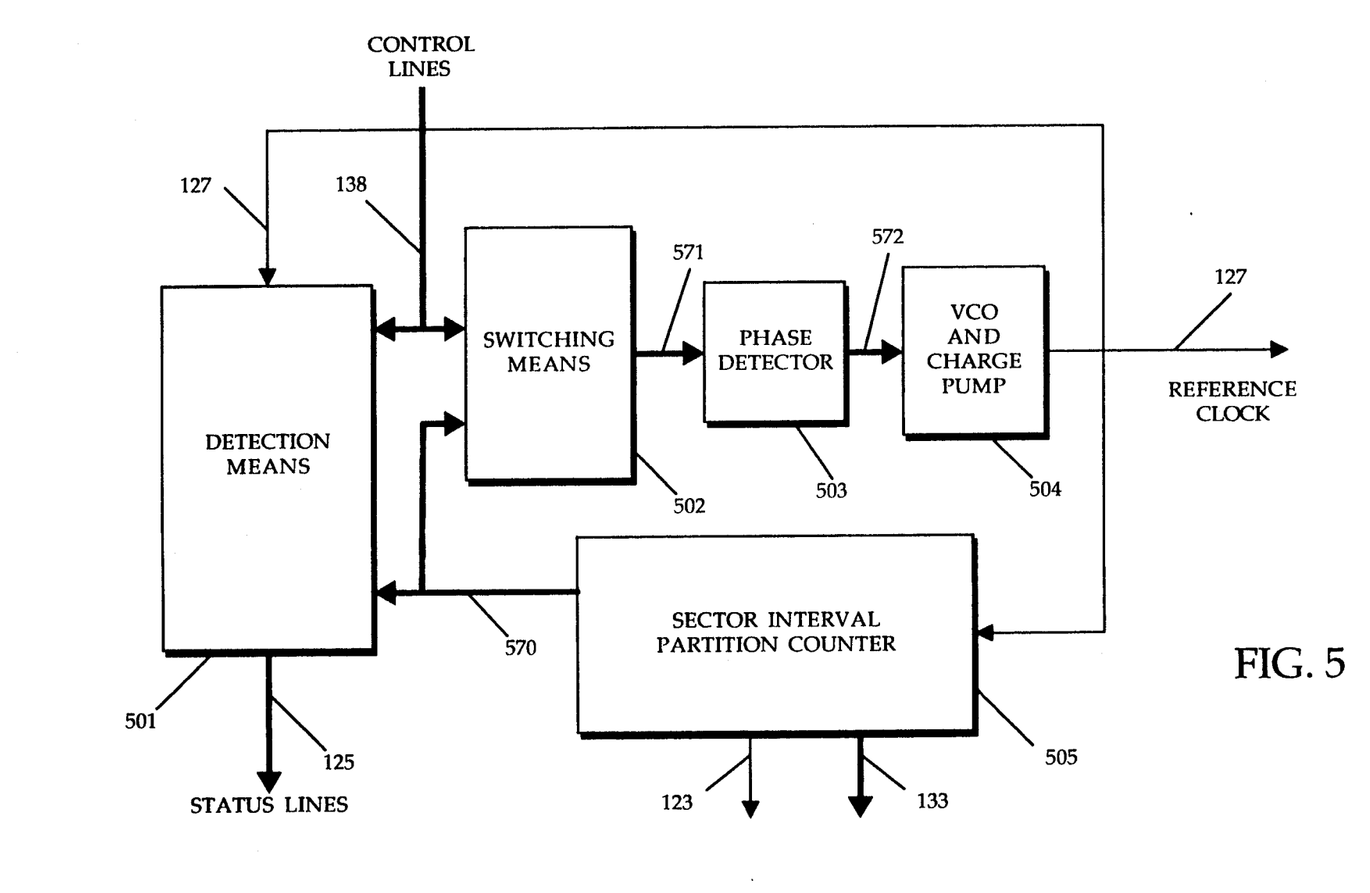
FIG. 5 is a top level block diagram of the servo PLO.

FIG. 5 illustrates a block diagram of PLO 100. Detection means 501 is coupled to bus 125, carrying status signals from the PLO to external control circuits. Detection means 501, sector interval partition counter 505 and switching means 502 are coupled to bus 570. Detection means 501 and switching means 502 are coupled to bus 138, also. Bus 138 carries mode select and control signals into the PLO, from external controlling circuits. Switching means 502 is coupled to phase detector 503. Phase detector 503 is coupled to VCO and charge pump 504. VCO and charge pump 504 provides reference clock signal 127 to detection means 501 and sector interval partition counter 505, as well as external circuitry. Sector interval partition counter 505 is coupled to bus 133, conveying timing tags from the PLO to other servo circuits, and also provides interrupt signal 123.

Detection means 501 is responsible for detecting the occurrence of servo gaps and framing characters within a digital data signal received from bus 125. The detection means 501 then provides corresponding detection signals to switching means 502 and status signals to DSP 109 (of FIG. 1) through bus 138.

Switching means 502 receives detection signals from bus 138 and also receives reference signals from bus 570. Switching means 502 provides two of these detection and reference signals to the phase detector for phase comparison and one signal to the phase detector for enabling the detection circuitry. Phase detector 503 provides "pump up" and "pump down" signals to VCO and charge pump 504 based upon the results of this phase comparison.

VCO and charge pump 504 provides a reference clock signal (127) to detection means 501 and sector interval partition counter 505. This reference clock signal can also be used by other circuit elements. The frequency of the reference clock signal 127 is a multiple of the frequency of the reference signals provided by the sector interval partition counter 505, and is raised or lowered in response to the "pump up" and "pump down" signals provided by phase detector 503.

The sector interval partition counter 505 is a counter interposed in the feedback loop of the servo PLO. States are decoded from the counter to demark events in each servo sector interval. From these decoded states, timing control signals are produced for use in the external servo circuitry. Servo protection logic 101 receives timing control tags through bus 133, and PES detector 102 receives timing control tags through bus 125 (see FIG. 1). In addition, signals demarking the detection windows are provided by sector interval partition counter 505 to detection means 501 through bus 570. Interrupt signal 123 is issued from the sector interval partition counter at the start of each servo burst 202, and causes the DSP 109 (FIG. 1) to update its control output based upon information demodulated from the servo burst.

Figure 3:
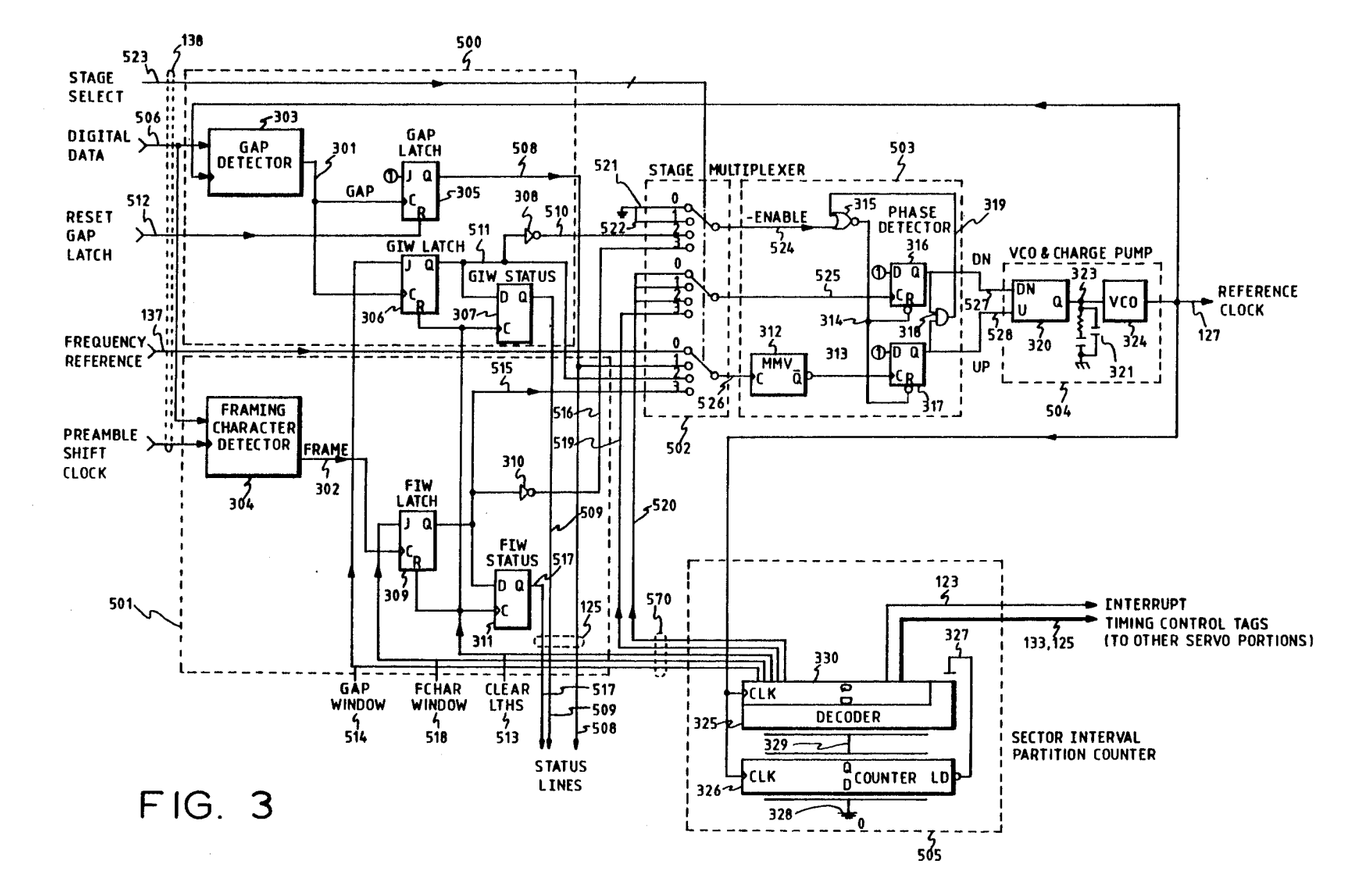
FIG. 3 is a bottom level block diagram of the servo PLO.

Referring now to FIG. 3, the operation of the servo PLO of the preferred embodiment occurs in four distinct operational stages, zero to three. The operational stages are entered progressively during PLO lock-up to servo data, and are established by the contents of stage select lines 523 (part of bus 138 in FIG. 5) which are applied to switching means 502.

Stage zero operation serves to initialize the PLO center frequency to an external reference frequency signal 137 (provided by DSP 109 through bus 138). Stage one operation involves the "pulling in" of the PLO frequency to the frequency and phase of the sector servo gap 204. Stage two maintains phase lock on the gap 204, but incorporates anticipating circuitry to suppress false correction operations in the PLO in the absence of servo gap information. Such absence can be caused by the presence of flaws in the disk recording surface. During the final stage of operation, stage three, the PLO phase-locks to framing character 206 located within the preamble 205. Stage three also incorporates the anticipating circuitry.

Stage zero, the initialization stage, establishes the nominal operating center frequency of reference clock signal 127 outputted from VCO and charge pump block 504. Frequency reference signal 137 is selected by switching means 502 and provided to second input signal line 526, and thence via "anticipating" monostable multivibrator 312 directly to phase detector 503, which operates as a phase/frequency comparator referenced to gap reference pulse 520. This pulse is produced in sector interval partition counter 505, passed through switching means 502 to first input signal line 525, and thence into the phase detector.

While in stage zero, the phase detector 503 is continuously enabled because switching means 502 provides a ground on line 521 to enable NOR gate 315. The reference clock signal 127 is responsible for triggering the gap reference signal 520 at set intervals from the sector interval partition counter 505. The feedback path thus established regulates the frequency of the VCO and charge pump 504 to a value equal to the product of the reference frequency and the counter modulus of the sector interval partition counter 505. The frequency reference signal 137 is chosen equal to the sector rate of the servo. The DSP 109 maintains stage zero operation for a time sufficient to ensure that the phase lock loop has locked, then advances PLO 100 to stage one by altering stage select lines 523.

Switching to stage one, the "pull-in" stage, causes PLO 100 to acquire frequency and phase lock on the gap area 204 of the servo burst 202, and requires microcode participation of the DSP 109 to achieve pull-in. Gap detector 303 detects the presence of a gap area 204 over the digital data line 506. Gap detector 303 then emits a pulse coinciding with the occurrence of the trailing edge of the gap area 204, and causes a pulse to be delivered over gap detected line 508 to the DSP 109. When DSP 109 recognizes that gap 204 has occurred, DSP 109 asserts gap latch reset signal 512 over bus 138. DSP 109 keeps signal 512 asserted for a fixed time (typically 90% of a sector), then commences to wait for gap detected status 508 to rise again to repeat the cycle. For the time period when reset signal 512 is asserted, gap detected signal 508 is kept low. By this process, spurious indications of gap detection caused by large isolated medium flaws or extended runs of low frequency data are effectively blocked from entrance to PLO 100.

Continuing, transitions of gap detected signal 508 are passed through switching means of 502 to second input signal line 526 into the phase detector 503. In this stage, ground wire 522 is passed through switching means 502 to enable line 524 thus continuously enabling the phase detector 503. Gap reference signal 520 is again passed through switching means 502 to first input line 525. In this manner, gap detected signal and gap reference signal are compared in the phase detector 503. Loop action enforces phase correspondence between these two inputs to the phase detector 503, hence locking the PLO 100 in phase to the incoming gap information.

A means is required for the DSP 109 to determine if phase lock to the required accuracy has been achieved in stage one of operation. This is achieved in the following manner. Gap window signal 514 is produced in the sector interval partition counter 505. The gap window signal 514 straddles the expected time of arrival of the gap detected pulse 508. If gap detector 303 detects a gap on digital data line 506 while gap window signal 514 is high, gap in window latch 307 outputs a high signal on gap in window status line 509 to bus 138. This signal informs DSP 109 that gap 204 is synchronized, within an acceptable phase tolerance, with the gap window signal 514.

PLO lockup is judged to have occurred if gap in window status line 509 is found asserted for a specified number of consecutive sectors (i.e., 48 in this embodiment). PLO 100 is then advanced to stage two via the stage select lines 523 from bus 138.

In stage two, PLO 100 is maintained in phase lock to the gap on digital data line 506 without participation of DSP 109. With switching means 502 in stage two operation, enable line 524 receives inverted gap in window signal 510, first input line 525 receives gap reference signal 520, and second input signal line 526 receives gap in window signal 511. Thus, phase detector 503 is disabled if the gap 204 does not occur during gap window signal 514. In this way, phase updates are suppressed in the event of missing servo reference information. Otherwise, phase detector 503 continues to adjust VCO and charge pump 504 through lines 527 and 528, thus maintaining phase lock. Note that it is permissible in some embodiments to omit stage two and proceed directly from stage one to stage three.

In stage three, the "frame phase lock stage," PLO operation is similar to that in stage two, except that the phase reference is obtained from the framing character 206 (instead of servo burst gap 204), which is detected in fault tolerant manner by framing character detector 304. The framing character detector utilizes framing character window signal 518 generated in sector interval partition counter 505. If the framing character is detected in the time interval designated by the framing character window signal 518, framing character in window status signal 517 is asserted on bus 138, thus reporting phase lock status to DSP 109. Switching means 502 selects inverted framing character in window signal 516 for enable line 524, and also framing character in window signal 515 for second input line 526. For first input line 525, switching means 502 selects framing character reference signal 519 from sector interval partition counter 505. Both framing character reference signal 519 and framing character window signal 518 undergo a decoding delay in the sector interval partition counter 505 adequate to bring them into time alignment with the servo burst framing character. This accounts for the time displacement between the gap signal and the framing character signal as noted in FIG. 2B. PLO 100 now operates in a similar manner to stage two operation.

While in stage three, PLO 100 operates without intervention of DSP 109, except for a periodic status check of the output of framing character in window status line 517 to ascertain that PLO 100 remains in lock. A criterion for PLO loss of lock could be loss of framing character in window status signal 517 for several consecutive sector times.

A further description of FIG. 3 is now given, for additional clarity. Gap detector 303 receives reference clock signal 127 and digital data signal 506. Gap detector 303 is coupled to gap latch 305 and gap in window latch 306 by line 301. Gap latch 305 then outputs gap detected signal 508. The reset input of gap latch 305 is reset controlled by reset gap latch signal 512. Gap in window latch 306 receives gap window signal 514 and is reset controlled by clear latch signal 513. Gap in window latch 306 then outputs gap in window signal 511. Gap in window signal 511 passes through inverter 308, becoming inverted gap in window signal 510. Gap in window status latch 307 receives gap in window signal 511. Latch 307 is clocked by clear latch signal 513. Latch 307 outputs gap in window status signal 509.

Framing character detector 304 receives digital data signal 506. Framing character detector 304 is coupled to framing character in window latch 309. Latch 309 receives framing character window signal 518 and is reset by clear latch signal 513. Latch 309 outputs framing character in window signal 515. Framing character in window signal 515 passes through inverter 310 to provide inverted framing character in window signal 516. Framing character in window status latch 311 receives framing character in window signal 515 and is clocked by clear latch's signal 513. Latch 311 outputs framing character in window status signal 517.

Switching means 502 is made up of a 3 bit 4-to-1 multiplexer shown schematically in FIG. 3 as three four-input switches. The first switch of switching means 502 selects, according to stage select lines 523, which input line will become enable signal 524. The input lines selected for stage zero through stage three are ground signal 521, ground signal 522, inverted gap in window signal 510, and inverted framing character in window signal 516, respectively. The second switch chooses which input line will become first input signal 525. The input selected for stages zero through two is gap reference signal 520, and the input signal selected for stage three is framing character reference signal 519. The third switch selects which input will become second input signal 526. The input selected for stage zero through stage three operation are reference frequency signal 137, gap detected signal 508, gap in window signal 511, and framing character in window signal 515, respectively.

Phase detector 503 is a conventional, sequential phase detector realized with cross-coupled edge-triggered D flipflops. NOR gate 315 receives enable line 524. NOR gate 315 outputs reset signal 314 to reset the outputs of D flipflops 316 an 317. Because D flipflops 316 and 317 are reset on a low signal, the phase detector 503 is enabled when enable line 524 is low. Both D flipflop 316 and D flipflop 317 have D inputs receiving a logical one signal value. D flipflop 316 receives, as a clocking signal, first input signal 525. D flipflop 316 then outputs "down" signal 527 to AND gate 318 and VCO and charge pump block 504. D flipflop 317 receives, as a clocking signal, delayed second input signal 313 from the inverted output of anticipating monostable multivibrator 312. Monostable multivibrator 312 receives, as input, the first input signal 526. D flipflop 317 outputs "up" signal 528 to AND gate 318 and VCO and charge pump block 504. AND gate 318 outputs the "in-phase" signal 319 to NOR gate 315.

VCO and charge pump block 504 receives, as input from block 503, "down" line 527 and "up" line 528. Lines 527 and 528 are coupled to charge pump 320. Charge pump 320 is coupled to voltage-controlled oscillator (VCO) 324 by voltage control line 323. Passive loop network 321 is coupled to line 323 and provides lead-lag plus integral compensation of the servo PLO. VCO 324 outputs reference clock signal 127.

In the sector interval partition counter block 505, the decoder registers 330 and counter 326 receive, as clock input, the clock reference signal 127. Decoder 325 outputs "load counter" line 327 to counter 326. Counter 326 is coupled to decoder 325 by counter cable 329. Counter 326 is coupled to ground by parallel load cable 328. Decoder registers 330 output lines 513, 514, 518, 519 and 520 to other portions of the PLO circuit. In addition, decoder registers 330 also output timing signals to lines 123, 133, and 125 for other portions of the servo system external to the PLO.

The PLO operation is herein described with reference to FIG. 3. Gap detector 303 detects gap area 204 in the servo burst signal; this detector can be implemented by a counter clocked by the output of VCO 324, but which is reset periodically by the presence of servo information on digital data line 506 (from bus 125). As a result, gap detector 303 delivers an output 301 when a suitable interval has elapsed in which no reset has occurred. Gap latch 305 is wired such that whenever signal 310 is asserted, gap latch 305 will be clocked to output a true state. Gap latch 305 is held in low state by DSP 109 through the reset gap latch signal 512. Gap latch 305 is important for stage one operation. Gap in window latch 306 is important for stage two operation. It, too, is clocked by signal 301 from gap detector 303, but it will only assert a high output on line 511 if gap window signal 514 is asserted when the latch is clocked. Latch 306 is reset by the timed clear latches signal 513. Gap in window signal 511 serves both as a second input frequency signal for the circuit and an enable signal during stage two operation. Signal 511 is inverted by inverter 308 prior to being passed as an enable signal, because phase detector 503 is enabled on a low false rather than a high true signal value. Signal 511 also serves as an input to gap in window status latch 307. Status latch 307 reports gap in window status to DSP 109 through signal line 509. Status latch 307 clocks in signal 511 whenever clear latches signal 513 is asserted.

For stage three operation, the PLO switches from gap detection to framing character detection. Framing character detector 304 is constructed as a shift register and majority vote decoder. When a framing character is detected, line 302 is asserted, thus clocking the framing character in window latch 309. If framing character window signal 518 is asserted during the rising edge of the clock signal for latch 309, then framing character in window signal 515 will be asserted. Signal 515 is used as an input for framing character in window status latch 311. It is also used as a second input signal for the phase detector during stage three and its inverse is used as an enable signal during stage three. As with the gap in window latch signal 511 during stage two, the signal 515 must be inverted before being passed to the enable line 524. Also, in the same manner as gap in window status latch 307, framing character in window status latch 311 holds the framing character in window status signal 517 for the digital signal processor 109. Latch 311 is also clocked by the clear latches signal 513 from the sector interval partition counter 505.

The sector interval partition counter 505 is responsible for producing timing control signals for the PLO and other portions of the servo system. The sector interval partition counter works as follows. Counter 326 receives the reference clock signal 127. The counter then outputs its values to decoder 325 which decodes the counter states into appropriate timing and control signals for the rest of the circuit and holds these values in register 330. Register 330 is also clocked by the reference clock signal 127. In this way, at appropriate intervals within the sector, the control and timing signals are asserted. At the end of each sector, the decoder outputs a signal to the counter load input which allows parallel loading of zeros from the ground state through line 328. The sector interval partition counter is responsible for supplying the framing character reference and gap reference signal for the first input in the phase detector for feedback of the phase lock loop.

Switching means 502, the stage select multiplexer, is comprised of three four-input/single-output multiplexor switches which are controlled simultaneously by the stage select lines. The selections are labeled by stage number (0-3) in FIG. 3.

Phase detector 503 is enabled by line 524. Due to the NOR gate 315 and the inverted reset inputs of flipflops 316 and 317, phase detector 503 is enabled by a logical zero on wire 524. Since the inputs of flipflops 316 and 317 are wired high and because the first input signal 525 and the second input signal 526 are used as clock signals, whenever an input pulse appears on either line 525 or 526, the outputs of flipflop 316 or 317, respectively, are held high until reset. Due to the AND gate 318 and the feedback loop of the phase detector, the output of the first flipflop to be clocked high will remain high until the second flipflop is clocked, at which time the feedback loop will reset the flipflops.

The monostable multivibrator 312 is used as part of an anticipating circuit. Multivibrator 312 imparts a delay of approximately half of the width of the gap window gate to the second input signal 526 of phase detector 503. This delay adjusts the second input of the phase detector to coincide nominally with the first input. The first input is delayed by the decoder circuit 325. It is important to note that although monostable multivibrator 312 is used in stages zero and one of PLO operation, its operation is incidental. In stages two and three, multivibrator operation assists in suppression of PLO phase updates in the event of missing servo reference information. Should flipflop 316 be clocked first by first input signal 525, then "pump down" signal 527 will be asserted. Should the delayed second input signal 313 clock flipflop 317 first, then "pump up" signal 528 will be asserted. Once both flipflops 316 and 317 have been clocked, the phase detector is disabled. Flipflops 316 and 317 implement a sequential phase/frequency detector known in the art.

The charge pump 320 responds to inputs 527 and 528 by injecting charge into, or removing charge from, passive filter network 321. If charge pump input line 527 is asserted, then the voltage at node 323 is lowered, if line 528 should be asserted, then the voltage at node 323 is raised. The passive filter network 321 compensates the PLO for required loop bandwidth and transient performance.

The voltage-controlled oscillator (VCO) 324 emits a signal at a frequency determined by the voltage on line 323. Combined action of the sector interval partition counter and the phase detector forces the VCO to operate at a multiple of the incoming sector sample rate of typically 10.5 KHz. The VCO output is also provided to different parts of the circuit and servo system on line 127.

Figure 4:
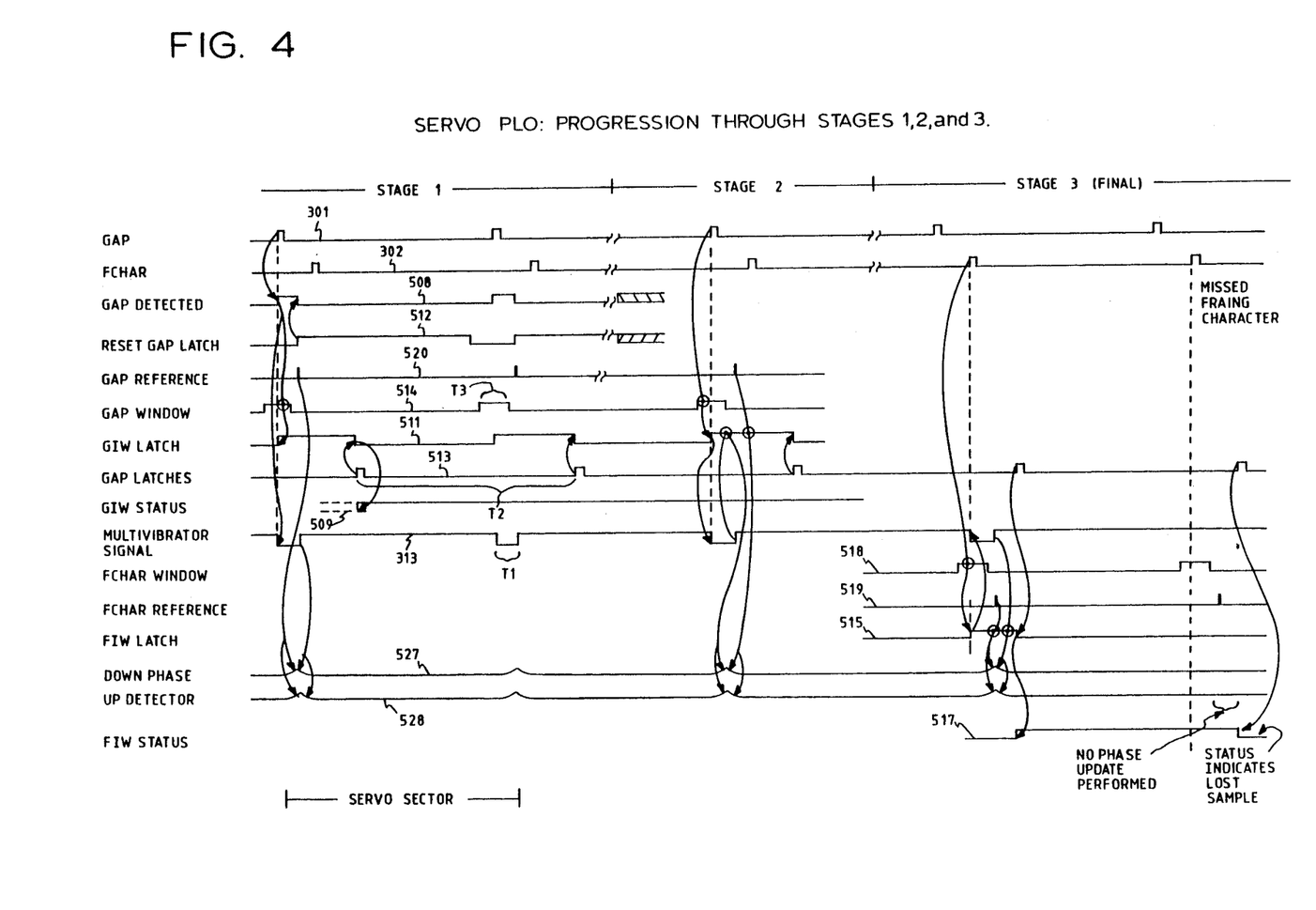
FIG. 4 is a timing diagram of the PLO progression through stages one, two and three.

FIG. 4 depicts typical wave forms observed in the servo PLO; wave forms are numbered and annotated with corresponding signals in FIG. 3. Only wave forms pertinent to stages one through three are illustrated; the last cycle of stage three also demonstrates PLO behavior in the event of a missing servo burst, in which no PLO phase update is performed.

During stage one operation, when a gap in digital data occurs in line 506, gap detector 303 asserts gap signal 301. The rising edge of gap signal 301 clocks gap latch 305 into a high state asserting gap detected signal 508. Since the timed gap window signal 514 is in the high state at the time of gap signal 301's rise, gap in window latch 306 clocks gap in window signal 511 high. As gap detected signal 508 rises, it clocks the beginning of the inverted pulse on the multivibrator signal 313. After a short delay, DSP 109 of FIG. 1 asserts gap latch reset signal 512. After a fixed delay T1, the multivibrator signal 313 rises to its high state; this transition is compared with gap reference signal 520 from the sector interval partition counter block 505. Down signal 527 and up signal 528 are asserted according to the phase comparison. At a preselected point in the sector interval T2, the sector interval partition counter 505 asserts clear latches signal 513. This in turn causes gap in window latch signal 511 to be reset, and gap in window status 509 to be asserted. This cycle continues until DSP 109 has determined that a fixed number of sectors have passed in which gap in window status signal 509 has remained asserted, at which point the DSP 109 alters stage select line 523 to transfer operation into stage two.

During stage two and stage three operation, reset gap latch signal 512 will remain unasserted, thus gap detected signal 508 will be latched high indefinitely. In stage two, as in stage one, if gap signal 301 is asserted during gap window signal 514 interval T3, then gap in window signal 511 will be latched high. The rising edge of gap in window latch signal 511 will trigger the beginning of a low-going pulse on anticipator multivibrator output signal 313. Since the gap in window latch signal 511 is high, the phase detector 503 compares the rising edge of multivibrator signal 313 and gap reference pulse 520. The phase detector 503 then triggers the down and up signals 527 and 528 accordingly. After the predetermined interval T2, the clear latches signal 513 is asserted and the gap in window latch signal 511 is reset.

In stage three, if the framing character is detected, signal 302 is pulsed. If this pulse occurs while the framing character window signal 518 from the sector interval partition counter 505 is asserted, then the framing character in window latch signal 515 is asserted. Signal 515 then triggers the beginning, or falling edge, of the multivibrator's inverted pulse on line 313. The rising edge of multivibrator signal 313 after delay T1 is then compared with the framing character reference signal 519 from the sector interval partition counter 505, and the phase detector 503 triggers "down" signal 527 and "up" signal 528 appropriately. When the timed clear latches signal 513 is pulsed, the framing character in window latch signal 515 is reset to its low "false" state and the framing character in window status signal 517 is latched into its true state. In the instance of a missed framing character, the framing character in window latch signal 515 is never asserted nor is the multivibrator signal 313 ever triggered. Since the framing character in window latch signal 515 is in its low state, phase detector 503 is never enabled, no phase update occurs, and the PLO coasts at its current state.

Figure 6A:
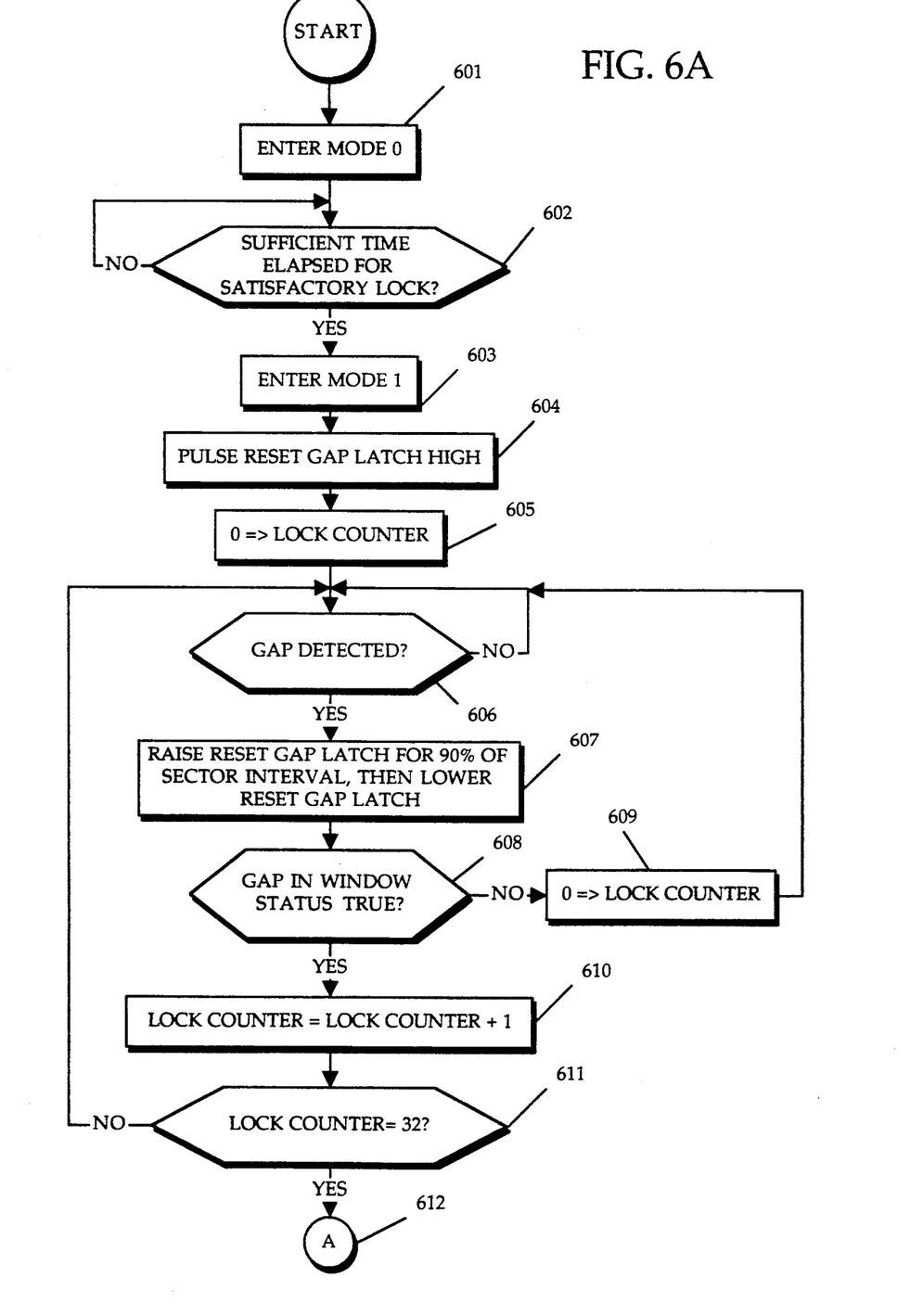
FIG. 6A is a flow diagram of the control process for stages zero and one of the PLO operation.
Figure 6B:
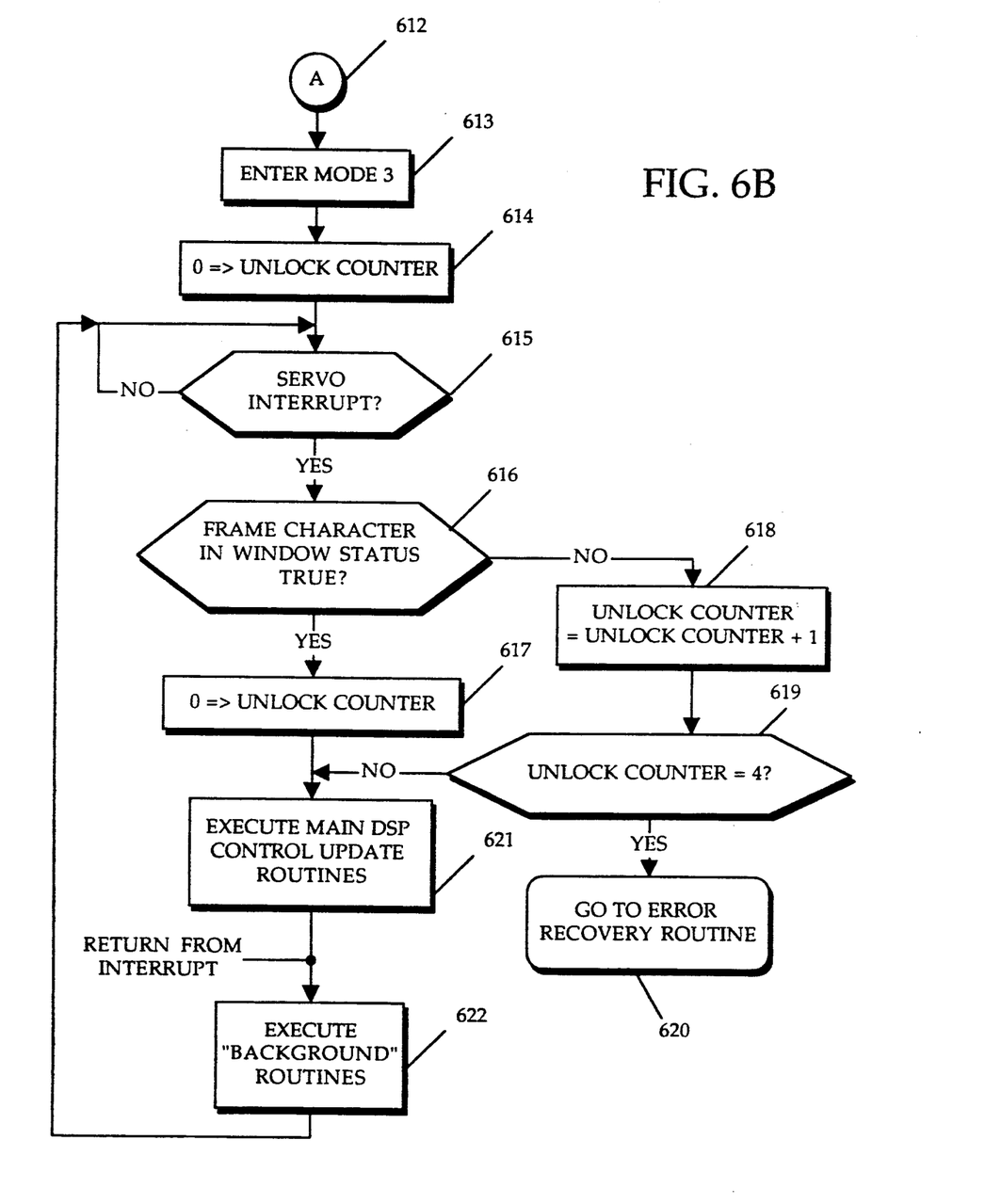
FIG. 6B is a flow diagram of the control process for stage three of the PLO operation.

FIGS. 6A-6B illustrate a flow diagram of the control process for one embodiment of the present invention. In this embodiment, the PLO progresses through stages zero, one and three. As noted earlier, operation in mode 2 can be, and has been, omitted from the sequence depicted in FIGS. 6A-6B. Operation begins in block 601 of FIG. 6A. The PLO enters stage zero and begins the operation of phase-frequency locking to the external reference signal. The PLO will continue to cycle through stage zero until sufficient time has elapsed for the PLO to gain satisfactory lock on the reference signal. When sufficient time has elapsed, as indicated in decision block 602, the digital signal processor will transfer the PLO into stage one operation (block 603).

In block 604, the "reset gap latch" signal is pulsed high to reset the gap latch output to a low value. In block 605, the lock counter, a software counter variable within the digital signal processor, is initialized to zero. The PLO operation then proceeds to decision block 606. Operation continues to cycle through decision block 606 until the servo gap is detected, at which time, the operation proceeds to block 607.

In block 607, the "reset gap latch" signal is raised to a high "true" value for 90% of sector interval and then lowered to enable the gap latch to function. Operation then proceeds to decision block 608. If "gap in window" status is not true, then operation proceeds to block 609, where the lock counter is re-initialized to zero. From block 609, operation returns to decision block 606. If "gap in window" status is false, then the operation proceeds to block 610, where the lock counter is incremented by one. Block 610 is followed directly by decision block 611.

In block 611, if lock counter is equivalent to a specified value (i.e. 32), then the digital signal processor commands the PLO to exit stage one operation. Operation would then proceed to node A (612). However, if lock counter is less than the specific value, then operation returns to decision block 606. The next stage of operation is entered into from node A. In this embodiment the next stage is stage three, which begins in FIG. 6B.

FIG. 6B illustrates the control process of stage three operation. Operation begins from node A (612) which is either proceeded by stage one or stage two of operation, depending on the embodiment implemented. Node A directs operation into block 613, wherein the PLO enters stage three. Block 613 is followed by block 614 in which another software counter variable, unlock counter, is initialized to zero. In decision block 615, which follows block 614 directly, the digital signal processor waits for the servo "interrupt" from the PLO. When the servo interrupt is received, the digital signal processor checks to see if the "framing character in window" status signal is true. If the framing character in window status signal is true then operation proceeds to block 617. If the framing character in window status signal is false, then operation proceeds to block 618. In block 618, unlock counter is incremented by one, and then operation is directed to decision block 619. In decision block 619, if unlock counter equals 4 (i.e., lost lock for four consecutive sectors), then operation proceeds to block 620, which sends the digital signal processor into an error recovery routine.

In block 617, unlock counter is re-initialized to zero, and operation is directed to block 621. In block 621, the digital signal processor executes the main DSP control update routines. In block 622, which follows block 621, the DSP returns from the interrupt and executes "backgound" routines. After block 622 is completed, operation is returned to decision block 615. This loop for stage three operation is continued indefinitely unless the digital signal processor is forced to go into an error recovery routine in block 620. Thus, a phase lock loop oscillator for a sector servo system has been described.

I claim:
1. A circuit comprising:
receiving means coupled to a clock signal for receiving an external input signal and generating a plurality of detection and status signals;
switching means coupled to said receiving means for selecting a plurality of selected signals from a plurality of detection and reference signals according to a plurality of staging signals;
phase detecting means receiving said selected signals from said switching means for detecting a phase difference and providing a plurality of phase control signals;

controlled oscillation means coupled to said phase detecting means, receiving said phase control signals and generating said clock signal;

controlling means coupled to said switching means for providing a plurality of staging signals; and interval partitioning means coupled to said receiving means, said switching means, said controlled oscillation means, and said controlling means; said interval partitioning means receiving said clock signal, and providing a plurality of timing and reference signals.

2. The circuit of claim 1 wherein said external input signal is a digital data signal.

3. The circuit of claim 1 wherein said receiving means comprises:

gap detection means for detecting servo gaps and providing at least one gap detection signal, and at least one gap status signal;

framing character detection means for detecting a framing character and providing at least one framing character detection signal, and at least one framing character status signal.

4. The circuit of claim 3 wherein said gap detection means comprises:

servo gap detector for receiving said external input signal, and for detecting the presence of said servo gap and providing a gap signal;

a first latch for receiving said gap signal, and for providing a first gap detection signal;

a second latch for receiving said gap signal, and for providing a second gap detection signal;

a third latch for receiving said second gap detection signal, and for providing said gap status signal;

a first inverter for receiving said second gap detection signal, and for providing an inverted second gap detection signal.

5. The circuit of claim 4 wherein said gap detector comprises a sequential counter with a reset input node receiving said external input signal.

6. The circuit of claim 4 wherein said framing character detection means comprises:

framing character detector for receiving said external input signal, and for detecting the presence of said framing character and providing a framing character signal;

a fourth latch for receiving said framing character signal and providing a framing character detection signal;

a fifth latch for receiving said framing character detection signal and providing a framing character status signal;

a second inverter for receiving said framing character detection signal and providing an inverted framing character detection signal.

7. The circuit of claim 6 wherein said framing character detector comprises a shift register and majority vote decoder.

8. The circuit of claim 6 wherein said switching means comprises first, second and third four-to-one multiplexers providing first, second and third selected signals from first, second and third multiplexer output nodes, respectively, and having a plurality of input nodes.

9. The circuit of claim 8 wherein said first four-to-one multiplexer has:

first and second input nodes coupled to ground;

a third input node receiving said inverted second gap detection signal; and a fourth input node receiving said inverted framing character detection signal.

10. The circuit of claim 8 wherein said second four-to-one multiplexer has:

first, second and third input nodes receiving a gap reference signal; and a fourth input node receiving a framing character reference signal.

11. The circuit of claim 8 wherein said third four-to-one multiplexer has:

a first input node receiving an external reference signal;

a second input node receiving said first gap detection signal;

a third input node receiving said second gap detection signal; and a fourth input node receiving said framing character detection signal.

12. The circuit of claim 8 wherein all of said multiplexers select from said input nodes equivalently, based on said staging signals.

13. The circuit of claim 8 wherein said phase detecting means comprises:

a NOR gate with a first NOR input node receiving said first selected signal and a second NOR input node receiving a feedback signal for providing a reset signal;

a first flipflop with a first clock input node receiving said second selected signal, a first "D" input node coupled to supply voltage and a first reset input node receiving said reset signal for providing a first phase control signal;

a second flipflop with a second clock input node receiving said third selected signal, a second "D" input node coupled to said supply voltage, and a second reset input node receiving said reset signal for providing a second phase control signal; and an AND gate with a first AND input node receiving said first phase control signal and a second AND input node receiving said second phase control signal, for generating said feedback signal.

14. The circuit of claim 13 further including a delay means coupled between said third multiplexer output node and said second clock input node for delaying said third selected signal.

15. The circuit of claim 1 wherein said controlled oscillation means comprises:

a charge pump receiving said phase control signals for controlling a voltage at a control node;

filtering means coupled to said control node and to a ground plane, for filtering-out of high frequency signals at said control node;

a voltage controlled oscillator (VCO) coupled to said control node, for providing said clock signal.

16. The circuit of claim 1 wherein said controlling means comprises a digital signal processor, which further provides said external reference signal and a detection control signal to said receiving means.

17. The circuit of claim 16 wherein the controlling of said staging signals is done according to microcode within said digital signal processor.

18. The circuit of claim 1 wherein said interval partitioning means comprises:

counting means receiving said clock signal for providing state signals;

decoding means coupled to said counting means for decoding a plurality of timing signals based on said state signals;

register coupled to said decoding means for storing said timing signals and providing said timing signals to said receiving means and said controlling means, and providing said reference signals to said switching means.

* * * * *